United States Patent [19]

Itani

[11] Patent Number: 4,473,920

[45] Date of Patent: Oct. 2, 1984

[54] CLEAR VIEW SCREEN

[75] Inventor: Jun Itani, Kobe, Japan

[73] Assignee: Osaka Hatsudenki Co., Ltd., Osaka, Japan

[21] Appl. No.: 509,032

[22] Filed: Jun. 29, 1983

[30] Foreign Application Priority Data

Jul. 19, 1982 [JP] Japan .......................... 57-110594[U]

[51] Int. Cl.³ ............................ B60S 1/10; B60S 1/44
[52] U.S. Cl. ............................... 15/250.22; 296/84 H; 114/177
[58] Field of Search ............ 15/250.22, 250 R, 250 A; 296/84 H; 52/171; 114/177, 178

[56] References Cited

U.S. PATENT DOCUMENTS 3,688,081  8/1972  Speich ............................ 15/250.22

FOREIGN PATENT DOCUMENTS 789763  7/1968  Canada ........................... 15/250.22
2655975  6/1978  Fed. Rep. of Germany ... 15/250.22
275941  10/1970  U.S.S.R. ......................... 15/250.22

*Primary Examiner*—Peter Feldman
*Attorney, Agent, or Firm*—Birch, Stewart, Kolasch & Birch

[57] ABSTRACT

A clear view screen (11) comprises a fixed frame (5), a rotating frame (7) and an induction motor (22). The fixed frame (5) has an inner peripheral surface (6) with a V-shaped section, where slits (33) are provided. The rotating frame (7) has an outer peripheral surface (8), which is also V-shaped in section. Compressed air blows into the slits (33) through an air path (35) and an air supply pipe (17), so that the rotating frame (7) is supported rotatably within the fixed frame (5). In this state, the rotating frame (7) is rotated by means of the induction motor (22). As a result, waterdrops and the like adhering to a transparent plate (9) provided in the rotating frame (7) can be removed by centrifugal force.

3 Claims, 6 Drawing Figures

CLEAR VIEW SCREEN

BACKGROUND OF THE INVENTION

1. Field of the Invention

The present invention relates to a clear view screen, and more particularly, pertains to a clear view screen in which a rotating frame is floated by air within a fixed frame so as to be rotated.

2. Description of the Prior Art

A clear view screen is provided in a side wall of a ship and the like or in a windshield of a wheelhouse so that waterdrops etc. adhering to the clear view screen are removed by centrifugal force caused by rotation of a glass plate.

FIG. 1 is a partial, sectional front view showing an example of a conventional clear view screen 1. FIG. 2 is a partial sectional view taken along the line II—II in FIG. 1. FIG. 3 is a partial perspective view of a fixed frame 5 for showing air blowing holes 15, where portions unnecessary for explanation are omitted.

In the structure shown in the drawings, the conventional clear view screen 1 comprises, in principle, a fixed frame 5 provided in a windshield 3 and the like of a ship etc., a rotating frame 7 provided rotatably with a gap 13 within the fixed frame 5 and equipped with a transparent plate 9 such as a glass plate, an air blowing means including air blowing holes 15 for blowing air into the gap 13 to float the rotating frame 7 within the fixed frame 5 and an induction motor 22 for driving the rotating frame 7 raised in the fixed frame 5.

In more detail, a fixed frame 5 is provided in the windshield 3 of a ship and the like. As shown in FIG. 2, the fixed frame 5 is cylindrical, having a hollow inner peripheral surface 6 with a V-shaped vertical section. Within the fixed frame 5, a rotating frame 7 is disposed. The rotating frame 7 has a protruding outer peripheral surface 8 with a V-shaped vertical section, which corresponds to the inner peripheral surface 6 of the fixed frame 5. The rotating frame 7 is contained in the fixed frame 5 with a gap 13 left between the outer surface 8 of the rotating frame 7 and the inner surface 6 of the fixed frame 5. Accordingly, the rotating frame 7 is rotatable in a plane extending from a transparent plate 9. In order to decrease the rotational resistance of the rotating frame 7, that is, the frictional resistance between the inner surface 6 of the fixed frame 5 and the outer surface 8 of the rotating frame 7, the rotating frame 7 is floated within the fixed frame 5 by the force of air supplied by the air blowing means.

Now, description will be made of the air blowing means. A plurality of air blowing holes 15 are formed at equal distances along the circumference of the fixed frame 5. One end of each air blowing holes 15 is opened to the gap 13 and the other end thereof is connected with a compressor or a blower (not shown) through an air supply pipe 17. Accordingly, compressed air from the compressor or the blower is sent to the air blowing holes 15 through the air supplying pipes 17 so as to blow forcefully into the gap 13 from the air blowing holes 15. The air blowing holes 15 are structured such that air blows to float the rotating frame 7 in a well balanced manner. More particularly, as shown in FIGS. 2 and 3, compressed air is made to blow into the gap 13 from the opposingly inclined planes of the inner surface 6 of the fixed frame 5 so that undesirable forces, that is, component forces applied perpendicularly to the rotating surface of the rotating frame 7 can be cancelled. The rotating frame 7 thus floated within the fixed frame 5 is made to rotate by an induction motor 22 used as a driving means, which will be described below.

In the induction motor 22, the fixed frame 5 serves as the stator side and the rotating frame 7 serves as the rotor side. More particularly, in the fixed frame 5, a stator core 23 is provided along the circumference of the fixed frame 5. A stator winding 25 is set around the stator core 23. Accordingly, when an alternating current is made to flow through the stator winding 25, a revolving magnetic field is generated due to the cooperated interaction with the stator core 23. On the other hand, in the rotating frame 7, a cylindrical rotor core 27 is provided in a coaxial circle with respect to the rotating frame 7. Further on the rotor core, a copper plate cylinder 29 is provided. The stator core 23 on the fixed frame 5 and the copper plate cylinder 29 on the rotating frame 7 are disposed with a small distance and thus, the rotating frame 7 is rotated by the action of the above described revolving magnetic field.

In operation, the compressor or the blower is operated to send air to the air supplying pipes 17. Air sent to the air supplying pipes 17 is made to blow forcefully into the gap 13 through the air blowing holes 15. Air forcefully blown into the the gap 13 is struck against the outer surface of the rotating frame 7 to cause a force to react. This force reacts in a direction in which the rotating frame 7 would move away from the fixed frame 5, and as a result, the rotating frame 7 is floated within the fixed frame 5. As described above, component forces applied in the undesirable directions are cancelled by each other by means of the two opposite air blowing holes 15 (see FIGS. 2 and 3). Thus, the rotating frame 7 is supported rotatably in a well balanced manner within the fixed frame 5.

Then, the driving means is operated. More specifically, an alternating current is supplied to the stator winding 25. The stator winding 25 through which alternating current flows interacts with the stator core 23 so as to generate a revolving magnetic field, which passes through the copper plate cylinder 29 and attains the rotor core 27 provided inside the cylinder 29. As a result, an electric current is generated in the copper plate cylinder 29 and by the action of this electric current and the above described revolving magnetic field, the rotating frame 7 is rotated. An arrow A in FIG. 1 shows an example of a rotating direction. In the above described manner, the rotating frame 7 rotates, and simultaneously a transparent material 9 provided in the rotating frame 7 rotates together, so that waterdrops and the like on the transparent material 9 can be removed by centrifugal force. Thus, excellent visibility through a clear view screen can be assured.

However, in a clear view screen as structured above, it is needed to blow a sufficient amount of air into the gap 13 in order to float the rotating frame, and as a result, a large number of small air blowing holes 15 must be formed at equal distances in the fixed frame 5, which makes the manufacture of the fixed frame 5 complicated. In addition, since air is made to blow from the discontinuous portions such as the air blowing holes 15, discontinuous air layers are generated in the gap 13, and in certain areas apart from the air blowing holes 15, the amount of air emitted from the gap 13 to the outside OUT decreases. As a result, it is feared that water and the like will infiltrate into the inside IN of the clear view screen from the outside OUT of the clear view screen through the gap 13. Furthermore, air is forced to pass through the air blowing holes 15 small-sized in section, which causes an increase in atmospheric pressure in the air supply pipes, and accordingly, the pressure of the compressor or the blower must be increased in order to supply air. Therefore, a clear view screen in which the above described disadvantages can be overcome has been desired.

SUMMARY OF THE INVENTION

In brief, the present invention relates to a clear view screen which comprises a cylindrical fixed frame having an inner peripheral surface with a V-shaped section, a rotating frame having an outer peripheral surface with a V-shaped section corresponding to the V-shape of the fixed frame, the rotating frame being enclosed rotatably in the fixed frame with a gap left between its outer surface and the inner surface of the fixed frame and provided with a transparent plate, an air blowing means for blowing air into the gap to float the rotating frame within the fixed frame and a driving means for driving the rotating frame floated within the fixed frame, the air blowing means including slits extending along the whole circumference of the inner surface of the fixed frame.

In accordance with the present invention, when compressed air is sent to the air blowing means, the air is made to blow forcefully from the slits into the gap. The air causes a force which is applied to the outer surface of the rotating frame, so that the rotating frame is supported rotatably within the fixed frame. On the other hand, the rotating frame is rotated by the driving means. In consequence, waterdrops and the like adhering to the transparent plate provided in the rotating frame can be removed by centrifugal force. Thus, excellent visibility can be assured through the clear view screen.

Therefore, a primary object of the present invention is to provide a clear view screen wherein the problems involved in using a number of discontinuous small air blowing holes in a fixed frame have been solved.

A principal advantage of the present invention is that since air is made to blow through continuous slits into the gap between a fixed frame and a rotating frame, air is emitted uniformly and forcefully from the gap to the outside and infiltration of water and the like into the gap can be avoided.

Another advantage of the present invention is that continuous slits can be more easily formed than a number of discontinuous small holes for air blowing and accordingly manufacturing of a fixed frame becomes easier.

A further advantages of the present invention is that since a sufficient amount of air for floating a rotating frame is made to blow from relatively large regions of slits which extend along the whole circumference of the inner surface of a fixed frame, a particularly high pressure is not needed at the time of blowing.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 4:
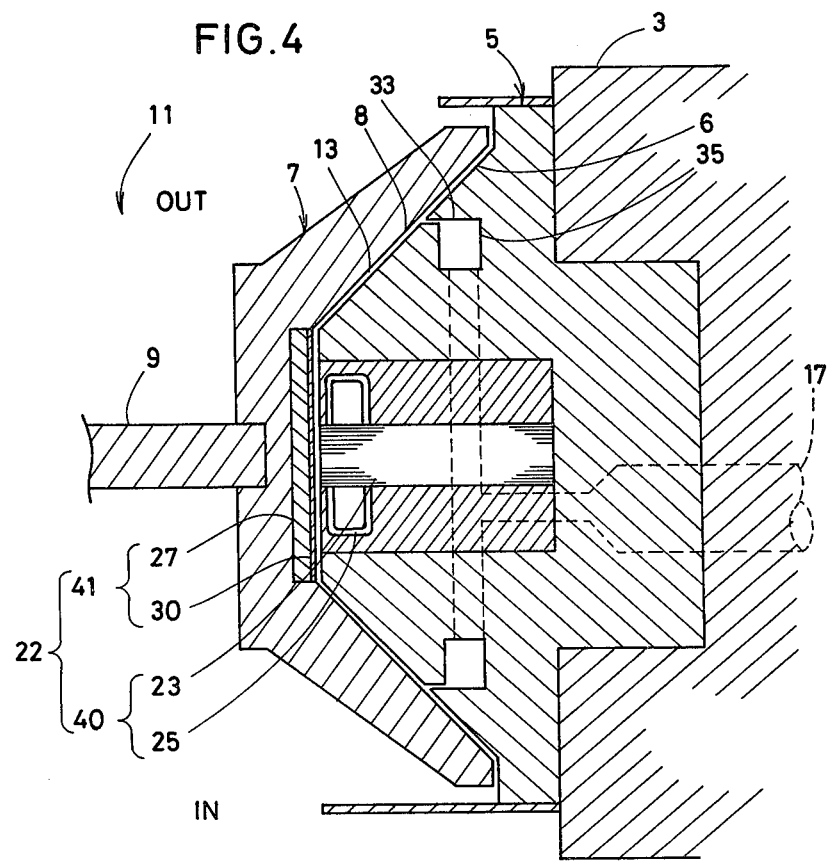
FIG. 4 is a partial sectional view of a clear view screen of one embodiment in accordance with the present invention.
Figure 5:
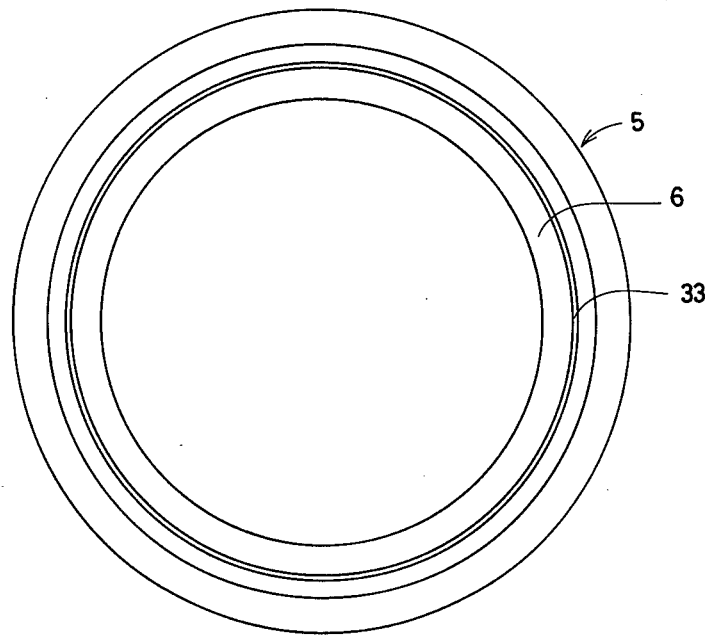
FIG. 5 is a plan view of a fixed frame from which a rotating frame is detached.
Figure 6:
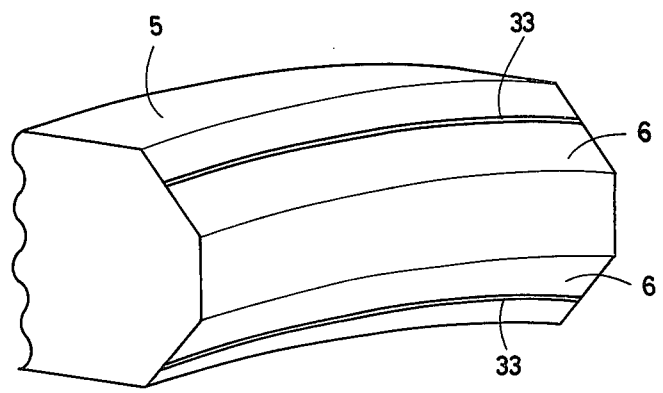
FIG. 6 is a partial perspective view of a fixed frame for showing slits.

FIG. 4 is a partial sectional view of a clear view screen 11 of an embodiment in accordance with the present invention. FIG. 5 is a plan view of a fixed frame 5 from which a rotating frame 7 is detached. FIG. 6 is a partial perspective view of a fixed frame 5 for showing slits 33, where portions unnecessary for explanation are omitted.

Figure 1:
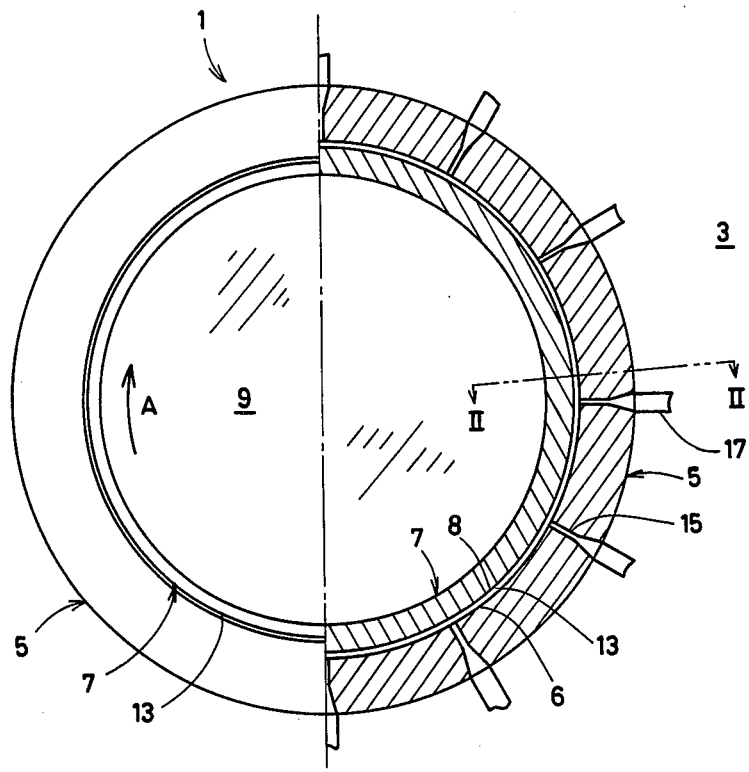
FIG. 1 is a partial, sectional front view showing an example of a conventional clear view screen.
Figure 2:
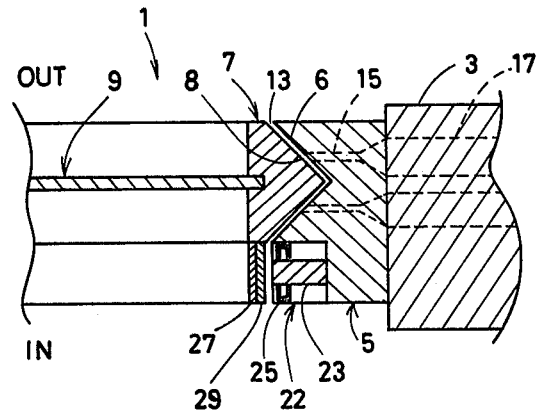
FIG. 2 is a partial sectional view taken along the line II—II in FIG. 1.
Figure 3:
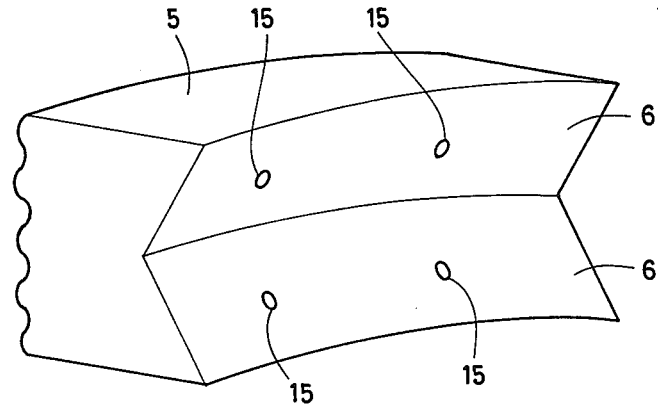
FIG. 3 is a partial perspective view of a fixed frame for showing air blowing holes.

Description will be made principally of different structural points compared with a conventional type as described above (in FIGS. 1 to 3). First, in a clear view screen 11 of this embodiment, a fixed frame 5 is formed such that it has a protruding inner peripheral surface 6 with a V-shaped vertical section. A rotating frame 7 has a hollow outer peripheral surface 8 with a V-shaped vertical section corresponding to the inner peripheral surface 6 of the fixed frame 5. Similarly to the above described conventional type, a gap 13 is formed between the inner surface 6 and the outer surface 8 and the rotating frame 7 is enclosed rotatably in the fixed frame 5. In the inner surface 6 of the fixed frame 5, slits 33 which extend along the whole circumference of the inner surface 6 are formed. These slits are connected with an air path 35 which is formed also in an extending manner along the whole circumference in the fixed frame 5. The air path 35 is connected to an air supply pipe 17 for sending air from a compressor or a blower (not shown). Accordingly, air sent out from the compressor is sent to the air path 35 through the air supply pipe 17 so as to blow into the gap 13 from the slits 33. In the drawings, OUT indicates the outside of the clear view screen and IN indicates the inside thereof.

Next, a driving means will be described. An induction motor 22 used as a driving means is provided approximately in a center with respect to the gap 13. More particularly, in the vicinity of the summit of the protruding inner surface 6 of the fixed frame 5, a stator core 23 and a stator winding 25 are provided so as to form a stator 40 of the induction motor 22. In the vicinity of the bottom of the hollow outer surface 8 of the rotating frame 7, a rotor core 27 whose surface is coated with a copper plating layer 30 is provided so as to form a rotor 41 of the induction motor 22. The positioning of the driving means approximately in a center with respect to the gap 13 as described above is advantageous in that force is applied in equilibrium and a symmetric shape of the gap 13 with respect to the driving means serves to float the rotating frame 7 in a well balanced manner. Furthermore, in this embodiment, a copper plating layer 30 with which the rotor core 27 is coated is used as a conductor for the rotor 41 of the induction motor 22. Thus, as a result of using a copper plating layer 30 instead of a copper plate cylinder 29 as in a conventional type, the rotor 41 of the induction motor 22 can be manufactured easily and since the thickness of the copper plating layer 30 can be adjusted by an extremely slight amount, an induction motor 22 with high precision can be realized.

In operation, the compressor or the blower starts operation to send air to the air supply pipe 17. The pressure of the air is, for example, 0.4 to 0.6 kg/cm$^2$. The air sent to the air supply pipe 17 is sent to the air path 35. The air path 35 is a circular path which extends along the whole circumference of the fixed frame 5. Since air cannot be easily drawn into the slits 33 from the air path 35, the air sent to the air path 35 circulates in it to be spread uniformly within the air path 35. The air thus spread uniformly is made to blow forcefully into the gap 13 uniformly in the whole circumference through the slits 33 provided along the air path 35. The air blown into the gap 13 causes a force to be applied to the outer surface 8 of the rotating frame 7 so that the rotating frame 7 is floated within the fixed frame 5. Furthermore, the air sent into the gap 13 flows outward in the gap 13 so as to be emitted to the outside. Since air is uniformly sent into the gap 13 in the whole circumference from the slits 33, the amount of air emitted from the gap 13 is also uniform in the whole circumference.

Thus, the rotating frame 7 floated and supported within the fixed frame 5 is driven by the induction motor 22, as in the conventional type (in FIGS. 1 to 3), so that waterdrops etc. adhering to a transparent plate 9, a glass plate, for example, can be removed by centrifugal force. Accordingly, even if rain or waves splash onto a ship and the like, excellent visibility can be assured through a clear view screen 11. In this case, the rotational speed of the induction motor 22 is 500 to 800 r.p.m., for example.

In the above described embodiment, the fixed frame 5 has a protruding shape and the rotating frame 7 has a hollow shape but such shapes are not given in a limited sense. As far as the sections correspond to each other, the shapes of the frames may be given reversely. In addition, as a driving means, an induction motor 22 incorporated in the fixed frame 5 and the rotating frame 7 is indicated, but the driving means is not limited to it and it may be structured such that the rotating frame 7 has fins and the like to which air blows to rotate the rotating frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clear view screen comprising:
   a cylindrical fixed frame having an inner peripheral surface with a V-shaped section,
   a rotating frame having an outer peripheral surface with a V-shaped section corresponding to the V-shape of said fixed frame, said rotating frame being provided rotatably within said fixed frame with a gap left between said outer peripheral surface and the inner peripheral surface of said fixed frame and being equipped with a transparent plate,
   air blowing means for blowing air into said gap to float said rotating frame within said fixed frame, said air blowing means including slits extending along the whole circumference of the inner peripheral surface of said fixed frame, and
   driving means for driving said rotating frame floated within said fixed frame.

2. A clear view screen in accordance with claim 1, wherein:
   said driving means is an induction motor comprising a stator and a rotor, said stator being provided in the vicinity of the summit of the inner peripheral surface of said fixed frame and said rotor being provided in the vicinity of the bottom of the outer peripheral surface of said rotating frame.

3. A clear view screen in accordance with claim 2, wherein:
   said rotor of said induction motor comprises
   a rotor core, and
   a copper plating layer formed in the surface of said rotor core.

* * * * *